United States Patent
Gluszyk

(10) Patent No.: US 6,990,046 B2
(45) Date of Patent: Jan. 24, 2006

(54) SONAR TRANSDUCER

(76) Inventor: Jozef J. Gluszyk, 10777 Richmond Ave., #404, Houston, TX (US) 77042

( * ) Notice: Subject to any disclaimer, the term of this patent is extended or adjusted under 35 U.S.C. 154(b) by 5 days.

(21) Appl. No.: 10/641,874

(22) Filed: Aug. 15, 2003

(65) Prior Publication Data

US 2004/0136271 A1 Jul. 15, 2004

Related U.S. Application Data

(60) Provisional application No. 60/403,628, filed on Aug. 15, 2002.

(51) Int. Cl.
H04R 1/00 (2006.01)

(52) U.S. Cl. ........................................................ 367/174
(58) Field of Classification Search ................. 367/908, 367/188, 163, 165, 174, 173; 181/123; 73/290 V; 340/621; 310/322, 324, 334
See application file for complete search history.

(56) References Cited

U.S. PATENT DOCUMENTS 3,834,233 A * 9/1974 Willis et al. ................. 367/908
5,962,592 A 10/1999 Hess et al.
6,246,154 B1 6/2001 Gluszyk et al.
6,585,659 B1 * 7/2003 Chesney et al. ............ 600/500

* cited by examiner

Primary Examiner—Daniel Pihulic
(74) Attorney, Agent, or Firm—Nick A. Nichols, Jr.

(57) ABSTRACT

A sonar transducer mounted on a probe inserted in a vessel or container emits a sonar wave for measuring the level of fluid interfaces within the vessel or container. The sonar transducer includes a housing closed by a diaphragm at one end. A piezoelectric crystal located within the housing is biased against the diaphragm and is electrically connected to an energizing source. The travel time of the sonar wave emitted by the piezoelectric crystal and reflected by the fluid interfaces is measured. The sonic wave measurements are communicated to a microprocessor and the levels of the liquid interfaces within the vessel or container are calculated.

16 Claims, 4 Drawing Sheets

SONAR TRANSDUCER

CROSS-REFERENCE TO RELATED APPLICATION

This application claims the benefit of U.S. Provisional Application Ser. No. 60/403,628, filed Aug. 15, 2002, which application is incorporated herein by reference.

BACKGROUND OF THE DISCLOSURE

The present invention relates to generally to industrial interface measurement devices, and more particularly to a measurement device using a sonar transducer to measure fluid to fluid, fluid to solid and fluid to gas interfaces in various industrial applications.

It is commonly known in the art that a piezoelectric crystal can be used as a transducer to emit a sonic or ultrasonic acoustic wave when excited by an AC voltage. Such a device may be used for determination of the distance of an object through the placement of a detector which senses when the emitted acoustic wave has reached the detector. Based on the time it takes the acoustic wave to reach the detector as well as the speed of the acoustic wave within the transmission medium, the distance from the source of the wave to the detector may be calculated. It is also known that the level of a liquid within a storage container may be determined through the use of a similar device and the concept of echo ranging. For example, U.S. Pat. No. 3,834,233 to Willis et al. discloses such a system. The system includes an ultrasonic transducer mounted at the top of a storage tank which directs an acoustic wave through the air down into a storage tank toward the surface of the liquid to be measured. Once the acoustic wave reaches the surface of the liquid, the wave's frequency is such that it will be reflected back toward the device which is equipped with a receiver to detect the reflected wave. The receiver thus detects the echo from the surface of the liquid and, based on the time for the signal to reach the surface of the liquid and return, calculates the distance from the ultrasonic transducer to the surface of the liquid.

However, such systems are not without their problems. Because such systems typically transmit the acoustic wave through a gaseous medium above the surface of the liquid to be measured, lower operating frequencies are required in order that the transmitted wave will be reflected at the liquid surface. These lower operating frequencies are less accurate in making distance measurements than higher frequencies. Such prior art systems have also been plagued by false signals received at the detector which did not originate from the device (such as outside noise) or which were not reflected from the material surface (i.e., reflected from the sides of the storage container). Prior art systems have also been plagued by the harsh conditions typically found within many industrial storage containers, particularly those storing corrosive substances. The quality of the device operation and the length of time these prior art detectors are able to maintain operation in such harsh environments result in their frequent malfunction and necessary replacement. Corrosive environments are especially hard on devices employing welded joints, epoxies or adhesives in their structures since it is at these points that corrosive effects are first manifested. Not only does the corrosive material itself decrease the operating life of such devices, but also changes in the operating environment of the device, including temperature and pressure changes, adversely affect such devices.

Finally, such prior art systems have been adversely affected by excessive dispersion of the emitted ultrasonic measurement beam such that the emitted signal is not strong enough to be reflected back to the device from a great distance (i.e. when the material in the storage container is at a low level). A weak emitted signal may also be caused by poor signal transfer within the device from the crystal to the emitting diaphragm. Another cause of poor device performance occurs when the detector radiates the transmitted signal in a number of directions, rather than in a narrow, focused beam, thereby increasing the possibility of falsely detecting reflected waves (e.g. from the storage container walls). The prior art has employed a variety of damping materials in various configurations to try and alleviate some of these problems. For example, U.S. Pat. No. 5,121,628, issued to Merkl et al. employs one such damping approach using lead pellets. For better signal transfer, the prior art has used bonding agents such as epoxies or solder, as disclosed in U.S. Pat. No. 4,000,650, issued to Snyder.

It is, therefore, an object of this invention to provide a sonar transducer which detects the presence of an object or material and is resistant to malfunction or deterioration caused by changing temperature, changing pressure, corrosive environments, or a combination of these conditions.

It is another object of the present invention to provide a sonar transducer which is installed within the fluid it is designed to measure.

It is still another object of the present invention to provide a sonar transducer which has greater accuracy than that provided by existing devices.

It is yet another object of the present invention to provide a sonar transducer with improved signal transfer, focus and strength resulting in a larger measurement range.

It is still another object of the present invention to provide a sonar transducer having an improved, smaller size.

It is yet another object of the present invention to provide a sonar transducer which can measure the material level of the contents within a storage container.

It is another object of the present invention to provide a sonar fluid-level detector which may be installed from the top, bottom, or side of a storage container.

SUMMARY OF THE INVENTION

In accordance with the present invention a sonar transducer mounted on a probe inserted in a vessel or container emits a sonar wave for measuring the level of fluid interfaces within the vessel or container. The sonar transducer includes a housing closed by a diaphragm at one end. A piezoelectric crystal located within the housing is biased against the diaphragm and is electrically connected to an energizing source. The travel time of the sonar wave emitted by the piezoelectric crystal and reflected by the fluid interfaces is measured. The sonic wave measurements are communicated to a microprocessor and the levels of the liquid interfaces within the vessel or container are calculated.

BRIEF DESCRIPTION OF THE DRAWINGS

So that the manner in which the above recited features, advantages and objects of the present invention are attained can be understood in detail, a more particular description of the invention briefly summarized above, may be had by reference to the embodiments thereof which are illustrated in the appended drawings.

It is noted, however, that the appended drawings illustrate only typical embodiments of this invention and are therefore not to be considered limiting of its scope, for the invention may admit to other equally effective embodiments.

DETAILED DESCRIPTION OF A PREFERRED EMBODIMENT

Figure 1:
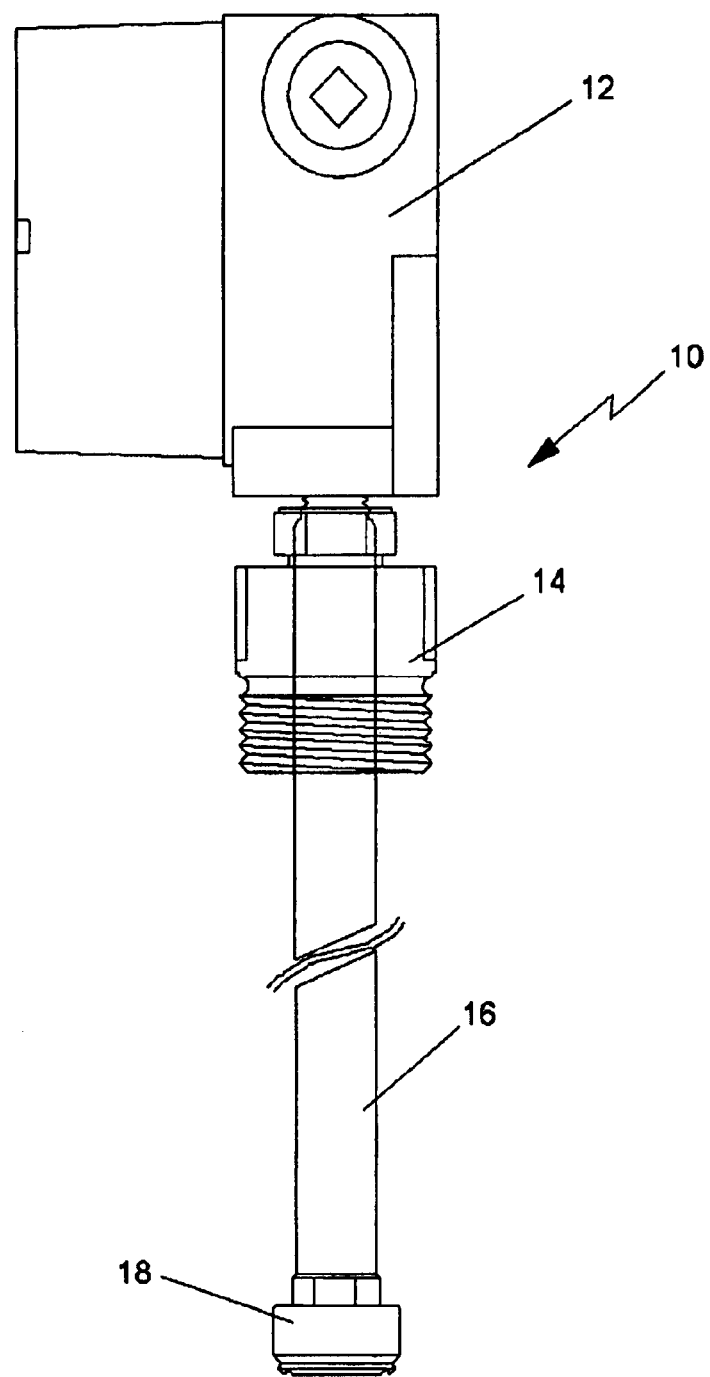
FIG. 1 is a side view of the device of the present invention.

Referring first to FIG. 1, the interface measurement apparatus of the invention is generally identified by the reference numeral 10. The apparatus 10 includes an electronics housing 12, a tank connector 14, a shaft 16 and a transducer 18 mounted on the distal end of the shaft 16. The transducer 18 is electrically connected to the electronics housing 12 by a wire extending through the shaft 16.

Figure 2:
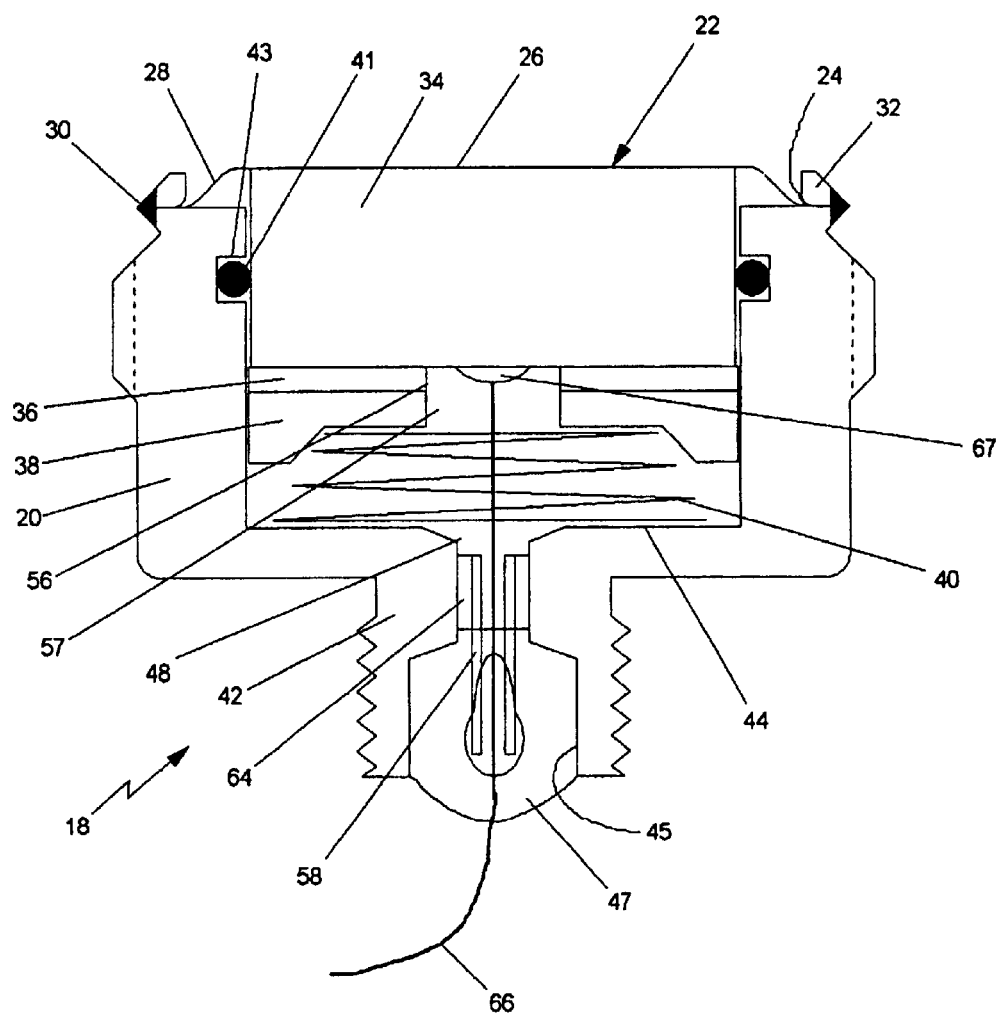
FIG. 2 is a section view of a preferred embodiment of the ultrasonic transducer of the present invention.

Referring now to FIG. 2, the transducer 18 is shown in greater detail. The transducer 18 includes a housing 20 having a generally cylindrical configuration open at a forward end thereof. The transducer 18 is manufactured of materials suitable to withstand harsh industrial demands and comply with regulatory requirements. Components may be selected of materials for specific application requirements and needs, such as food, corrosion, contamination, etc. In the preferred embodiment, the housing 20 material is SS316. Other suitable metals may also be used.

A diaphragm 22 is mounted to the forward end of the housing 20. The diaphragm 22 is fabricated from rolled metal sheet. However, the material choice for the diaphragm 22 depends on application requirements and environmental factors. The diaphragm 22 has a generally circular configuration cut out of the rolled metal sheet and stamped to include a circumferential flange 24 and a central disk portion 26. An inclined circumferential wall portion 28 joins the disk portion 26 to the flange 24. The diaphragm 22 is welded to the housing 20 at welding joint 30. A safety ring 32 is welded on top of the peripheral edge of the flange 24 to control heat related stress and deformation of the diaphragm 22.

Referring still to FIG. 2, a piezoelectric crystal disk 34 is located inside the housing 20 adjacent to the diaphragm 22. The crystal 34 is a generally solid cylindrical disk having flat opposed surfaces generally circular in cross-section. The crystal 34 is in facing contact with the inside surface of the diaphragm 22 at one end and in facing contact with an isolation washer 36 at the opposite end 10 thereof. A retaining washer 38 is biased against the isolation washer 36 by a spring 40 located between the retaining washer 38 and an internal circumferential shoulder 44 formed in the lower end of the transducer housing 20. An O-ring 41 is received in a circumferential internal groove 43 formed in the housing 20 near the forward end thereof. The O-ring 41 aids in centering the crystal 34 and forms a seal therewith to prevent fluid, such as oil, in the lower portion of the housing 20 from entering the upper portion of the housing 20 and coming into contact with the diaphragm 22.

A connector plug 42 depends downwardly from the lower end of the housing 20 and is integrally formed with the housing 20. The connector plug 42 is externally threaded for connection to the shaft 16. The connector plug 42 includes an axial passage 48 which terminates at the shoulder 44 of the housing 20 at the upper end thereof and the lower end of the passage 48 opens into an 20 enlarged bore 45 formed in the connector plug 42.

The isolation washer 36 and retaining washer 38 include centrally located holes 56 and 57, respectively. The holes 56 and 57 provides access for electrically connecting the crystal 34 to a power source to produce a sonic wave. The crystal 34 is electrically connected to an AC voltage source by a wire 66 extending through the tube 58 and soldered to the crystal 34 at 67. The wire 66 is also soldered to the lower end of the tube 58. The tube 58 is inserted into the passage 48 and sealed therein by a glass bushing 64 which is located about the tube 58 in the axial passage 48 extending through the connector plug 42. The bore 43 of the connector plug 42 is filled with epoxy 45, which epoxy 47 completely encapsulates the lower end of the tube 58 and a portion of the wire 66. The epoxy 47 provides some flexibility about the wire 66 so that it may move slightly without breaking.

The internal cavities of the transducer housing 20 are filled with a small amount of non-conductive and non-corrosive fluid through the tube 58 prior to welding the wire 66 to the lower end of the tube 58. The wire 66 functions as the positive lead for energizing the crystal 34. The housing 20 functions as the negative lead to complete the AC circuit. The crystal 34 may be biased with AC voltage at a high frequency so that it is energized and begins to vibrate. Vibration of the crystal 34 against the diaphragm 22 produces a sonic wave as is known in the art.

Figure 4:
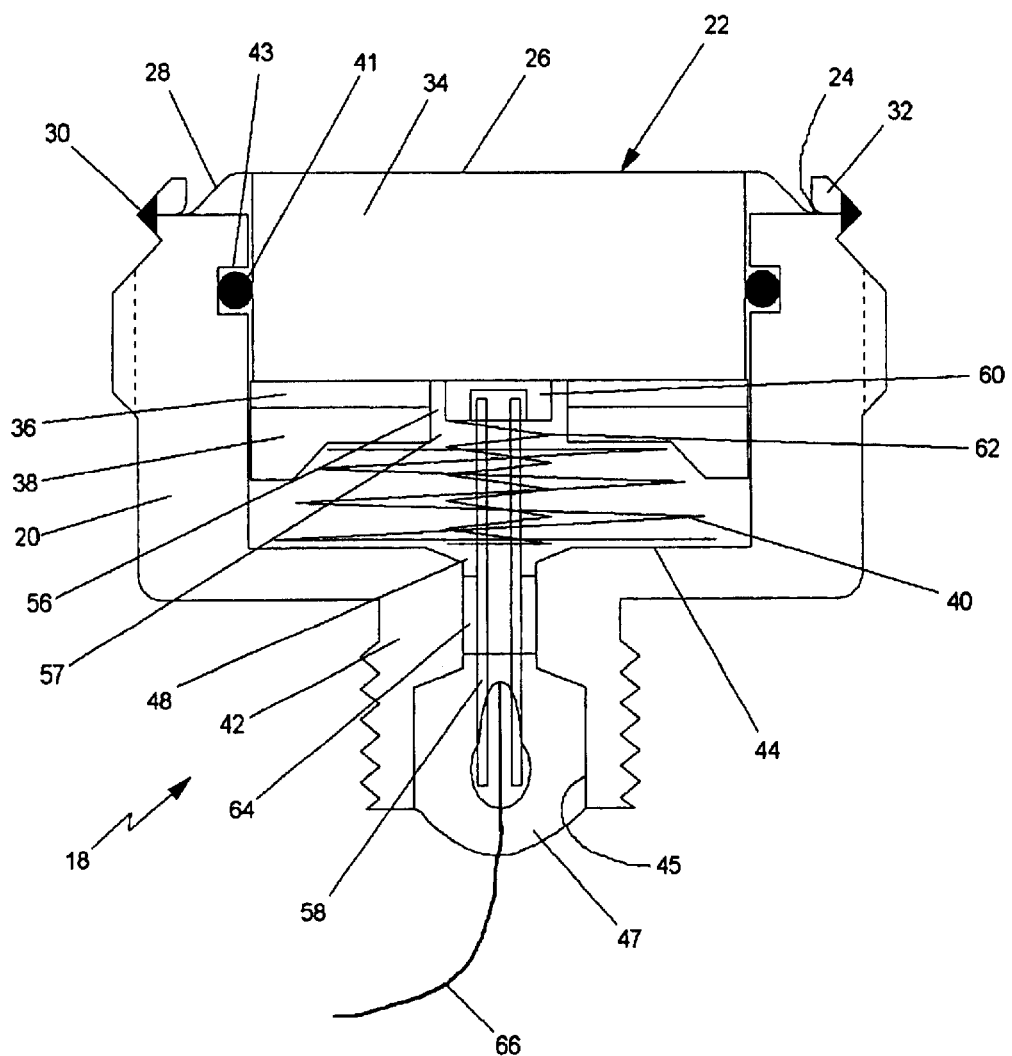
FIG. 4 is a section view of an alternate embodiment of the ultrasonic transducer of the present invention.

Referring now to FIG. 4, an alternate embodiment of the invention is shown. The transducer 80 of FIG. 4 is substantially the same as the transducer 18 described above, so the same reference numerals are utilized to identify like components. In the embodiment of FIG. 4, the wire 66 is soldered at the lower end of the tube 58. The tube 58 extends to the crystal 34 and is provided with a secondary spring spacer 60 mounted on the distal end thereof. The secondary spring spacer 60 is forced against the crystal 34 by a secondary spring 62 journaled about the tube 58 and compressed between the spring spacer 60 and the shoulder 44 of the housing 20. In the embodiment of FIG. 4, the tube 58 functions as the positive lead for energizing the crystal 34. The housing 18 functions as the negative lead to complete the AC circuit.

Figure 3:
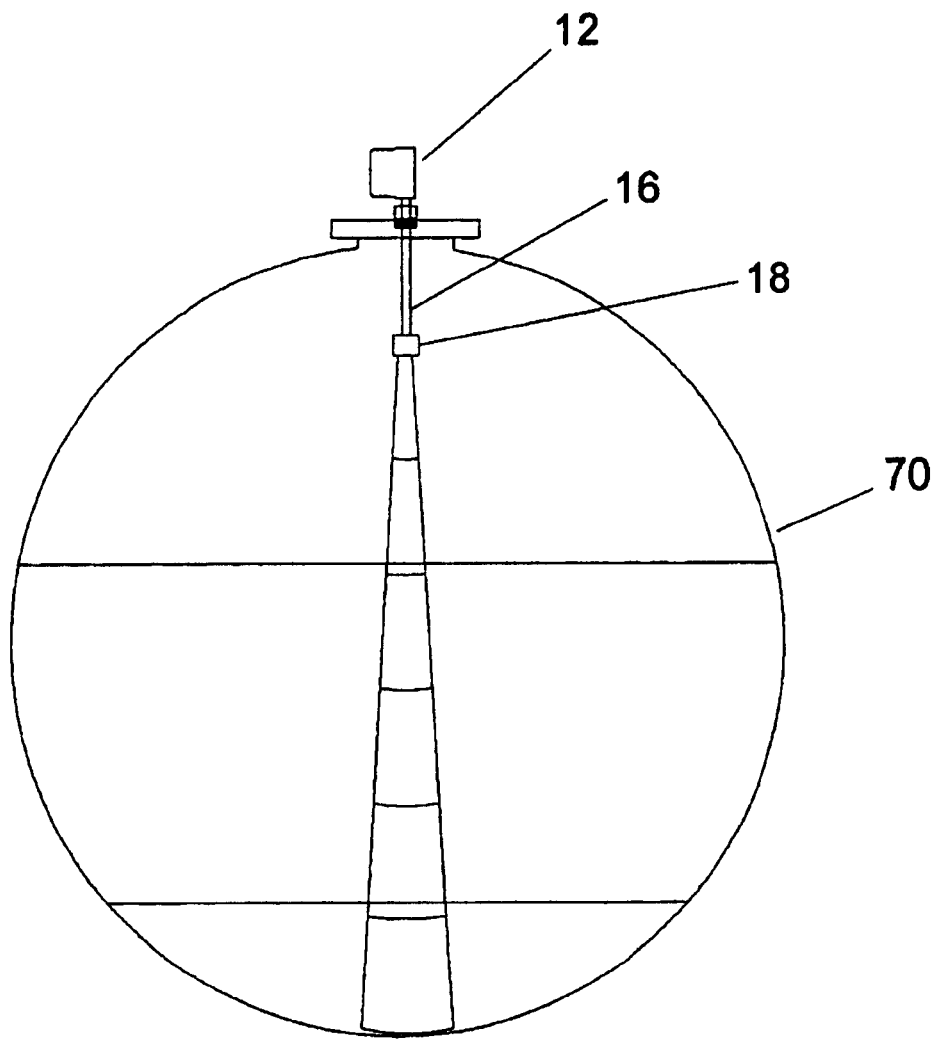
FIG. 3 is a section view illustrating the installation of the device of the present invention within a storage container.

Referring now to FIG. 3, use of the interface measurement apparatus 10 of the invention is illustrated. The transducer 18 and shaft 16 of the apparatus 10 are inserted through an opening in a storage tank 70. The tank connector 14 is threaded in the opening for securing the apparatus 10 to the storage tank 70. The electronic housing 12 remains on the outside of the storage tank 70 and is connected to a microprocessor and display. Upon set up and calibration of the apparatus 10, the crystal 34 is energized and emits it sonar wave toward the surface of the liquid to be measured. The signal emitted by the transducer crystal 34 travels through the liquid and is reflected from the fluid interface(s), solids in the fluid or the inner surface of the storage tank 70. The travel time of the sonar wave is measured and the level of the liquid interface(s) is calculated in a known manner. Multiple interfaces may be detected and measured, and the apparatus 10 of the invention may be mounted at various locations about the storage tank 70.

While a preferred embodiment of the invention has been shown and described, other and further embodiments of the invention may be devised without departing from the basic scope thereof, and the scope thereof is determined by the claims which follow.

I claim:

1. A sonar transducer for detecting the level of liquid to liquid and liquid to solid interfaces in a container, comprising:

a) a housing;
b) a diaphragm;
c) an annular ring securing said diaphragm across an end of said housing;
d) a piezoelectric crystal located within said housing adjacent to said diaphragm;
e) means for biasing said piezoelectric crystal against said diaphragm; and
f) means for electrically connecting said piezoelectric crystal to an energizing source.

2. The sonar transducer of claim 1 wherein said biasing means comprises a spring.

3. The sonar transducer of claim 2 including an isolation disk located adjacent said piezoelectric crystal opposite said diaphragm.

4. The sonar transducer of claim 1 including a single electrical connector connecting said piezoelectric crystal to said energizing source.

5. The sonar transducer of claim 3 including a retaining washer biased against said isolation disk by said spring.

6. The sonar transducer of claim 1 wherein said biasing means comprises a primary spring and a secondary spring.

7. The sonar transducer of claim 5 including a connector plug extending downwardly from a lower end of said housing, said connector plug including an axial passage opening into said housing, and a tube extending through said axial passage, and further including an electrical wire extending through said tube, said wire having one end fixed to said piezoelectric crystal and an opposite end thereof connected to said/energizing source, and wherein said axial passage of said connector plug is sealed about said tube and said wire.

8. The sonar transducer of claim 7 wherein said connector plug is adapted for connection to a distal end of a shaft extending into said container.

9. The sonar transducer of claim 7 wherein said tube includes a secondary spacer mounted on an end thereof, said secondary spacer being forced into contact against said piezoelectric crystal by a secondary spring journaled about said tube, and wherein said one end of said wire is connected to said tube.

10. An apparatus for detecting the level of liquid to liquid and liquid to solid interfaces in a container, comprising:
a) an electronics housing;
b) a container connector;
c) a shaft;
d) a transducer mounted on a distal end of said shaft, said transducer being electrically connected to said electronics housing by a wire extending through said shaft; and
e) wherein said transducer comprises a transducer housing and a diaphragm secured across an open end of said transducer housing, a piezoelectric crystal located within said transducer housing in facing contact with said diaphragm, and means for biasing said piezoelectric crystal against said diaphragm.

11. The apparatus of claim 10 wherein said transducer housing is of one piece construction.

12. The apparatus of claim 10 wherein said biasing means comprises a spring.

13. The apparatus of claim 10 including an isolation disk and a retainer washer baised against said piezoelectric crystal.

14. The apparatus of claim 10 including a connector plug extending downwardly from a lower end of said transducer housing, said connector plug including an axial passage opening into said transducer housing, and a tube extending through said axial passage, and wherein said wire extends through said tube with one end fixed to said piezoelectric crystal and an opposite end thereof connected to said electronic housing, and wherein said axial passage of said connector plug is sealed about said tube and said wire.

15. The apparatus of claim 10 wherein said transducer housing is filled with a non-conductive and non-corrosive fluid.

16. The apparatus of claim 14 wherein said tube includes a secondary spacer mounted on an end thereof, said secondary spacer being forced into contact against said piezoelectric crystal by a secondary spring journaled about said tube, and wherein said one end of said wire is connected to said tube.

* * * * *